T. WRIGHT.
DUMPING WAGON.
APPLICATION FILED MAY 29, 1909.
939,782.
Patented Nov. 9, 1909.
2 SHEETS—SHEET 1.
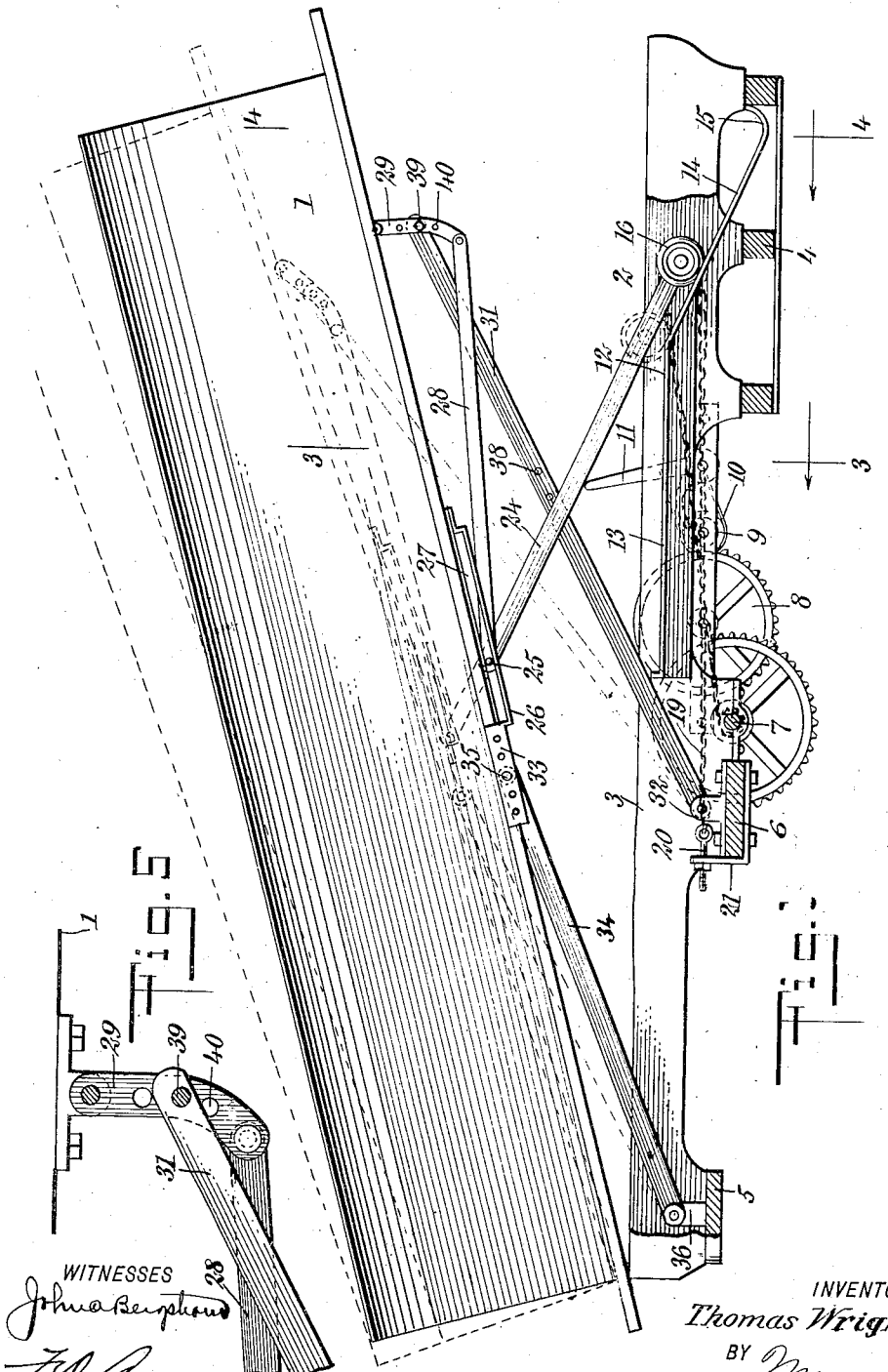
WITNESSES
INVENTOR
Thomas Wright
BY
ATTORNEYS

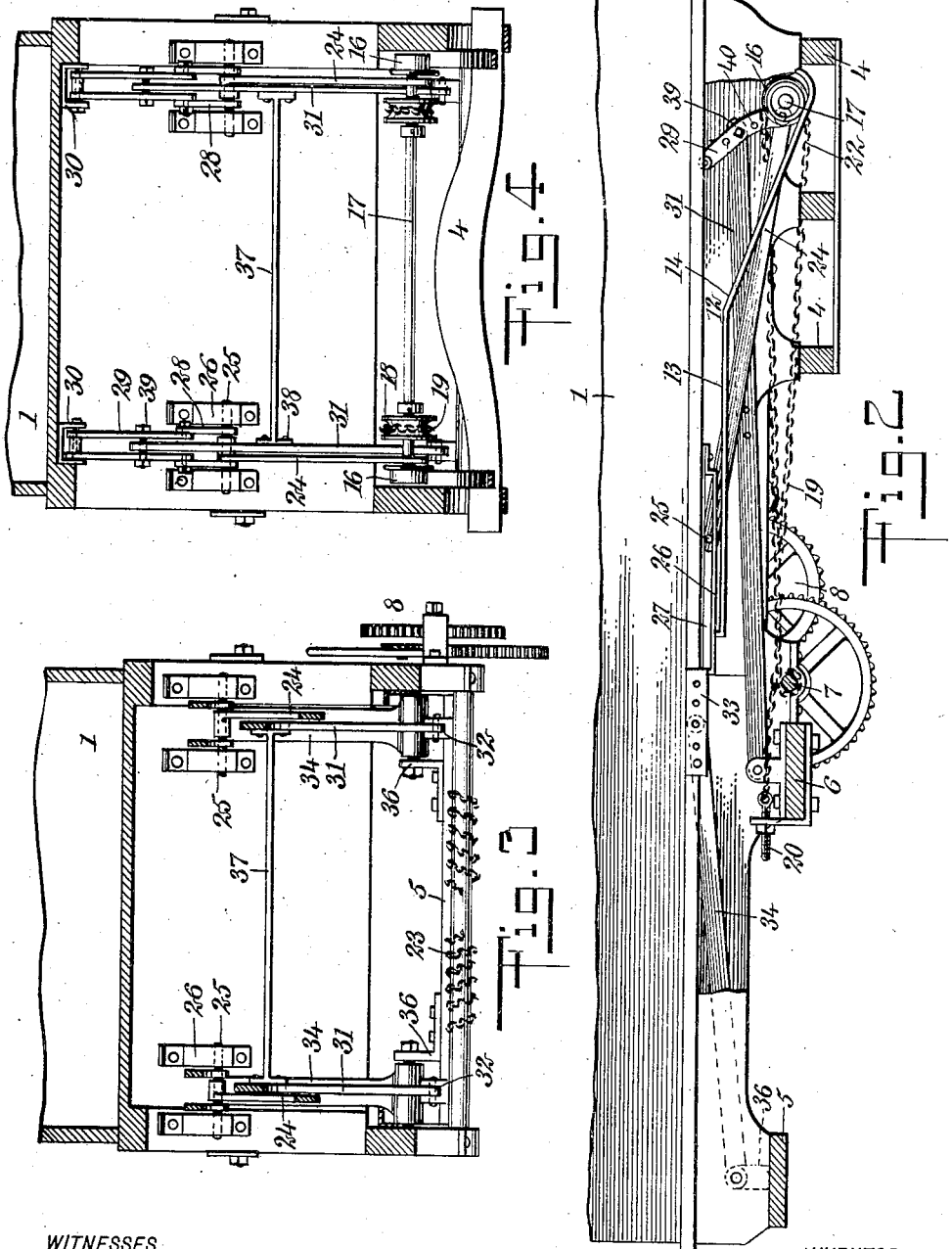

UNITED STATES PATENT OFFICE.

THOMAS WRIGHT, OF JERSEY CITY, NEW JERSEY.

DUMPING-WAGON.

939,782.  Specification of Letters Patent.  Patented Nov. 9, 1909.

Application filed May 29, 1909. Serial No. 499,141.

*To all whom it may concern:*

Be it known that I, THOMAS WRIGHT, a citizen of the United States, and a resident of Jersey City, in the county of Hudson and State of New Jersey, have invented a new and Improved Dumping-Wagon, of which the following is a full, clear, and exact description.

This invention relates to dumping wagons and carts such as used by coal dealers in delivering coal.

The object of the invention is to produce a wagon having improved mechanism for raising the body into an elevated and inclined position for dumping the load.

A special object is to provide a construction which will be capable of raising the body to an unusually high elevation.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a longitudinal section through the truck of the wagon, the body of the wagon and certain of the parts being shown in elevation, this view shows the body in a partly elevated position; Fig. 2 is a longitudinal section through the truck, the body of the wagon being shown in elevation and broken away, this view shows the body in its normal or depressed position upon the truck; Fig. 3 is a transverse section taken on the line 3—3 of Fig. 1, and further illustrating the construction of the elevating mechanism; Fig. 4 is a view similar to Fig. 3, but taken on the line 4—4 of Fig. 1; and Fig. 5 is a detail showing the manner of attaching the front legs of the elevating mechanism to the body.

Referring more particularly to the parts, 1 represents the body of the wagon or cart which is supported upon a truck 2, said truck being composed of side bars 3 connected by cross bars or forward bolsters 4 at the front, and connected at the rear by a rear bolster 5. Near its middle the truck construction comprises a transverse beam 6, and just forward of this beam I provide a main shaft 7 attached to the under side of the side bars or stringers 3. This shaft is adapted to be driven through a gear train 8 disposed at the side of the wagon, as indicated. The mechanism for connection with the gear train includes a brake wheel 9, about which a brake band or strap 10 passes, said brake band being attached to a brake lever 11, as indicated. By operating this brake lever 11 a high frictional resistance may be offered to the rotation of the brake wheel 9 and the gear train. In this way the body of the wagon may be held in an elevated position or allowed to descend slowly to it normal or depressed position.

Near the front of the truck I provide guide rails 12, which are attached to the inner sides of the side bars 3. These guide rails have horizontal extensions 13 and inclined extensions 14 which terminate in hooks or seats 15. On the guide rails, rollers 16 are adapted to roll, as indicated, and these rollers normally rest upon the seats 15 when the wagon body is in its depressed position. These rollers are carried rigidly upon an axle or roller shaft 17, and on this axle, chain wheels 18 are provided. In order to advance the shaft 17 I provide chains 19, the rear ends of which are attached to adjustable anchor bolts 20 mounted in brackets 21 on the beam 6. These chains form loops 22 passing around the chain wheels, and the other ends of the chains are attached to and wrap upon the shaft 7 in coils 23, as indicated in Fig. 3.

Near the ends of the shaft 17, main legs 24 are attached, and when the body is being raised, these legs are disposed in an inclined position, as indicated in Fig. 1. The upper ends of the legs are provided with transverse cross pins 25, the ends of which project and are received in guides 26 attached to the under side of the body, as indicated. These guides simply consist of longitudinal straps or bars offset downwardly so as to form guide slots 27 receiving the ends of the cross pins, as will be readily understood.

In connection with each of the main legs 24, a pair of links 28 is provided. The upper ends of these links are attached to the cross pins between the main legs and the guides, as shown most clearly in Fig. 3. These links 28 extend toward the front of the body and are attached to the lower ends of floating levers 29. There are two of these levers at each side of the body, as indicated in Fig. 4, and the upper ends of the levers are pivotally secured in brackets 30 on the under side of the body. Between each pair of floating levers 29, a front leg 31 is pivotally attached. These front legs 31 extend toward the rear of the wagon and are pivotally attached at their rear ends on brackets 32 seated on the upper side of the beam 6. The rear ends of the guides 26 are formed into cheek plates 33 which are riveted to the sides of the body, as shown, and to these cheek plates 33, back legs 34 are pivotally attached by suitable pins or bolts 35. These back legs 34 extend toward the rear end of the wagon, and are pivotally mounted on suitable brackets 36 seated on the cross beam 5.

In order to stiffen the front legs 31, they are connected near their middle point by a cross bar or brace 37 having expanded feet at the ends thereof connected to the legs by rivets 38, as shown.

When the wagon body is in its depressed position, the bottom of the wagon rests upon the frame of the truck and the elevating mechanism lies folded under the body, as indicated in Fig. 2.

In order to provide for adjustments in the connection between the front legs 31 and the floating levers 29, the attachment between these parts is made by means of removable bolts 39, and a plurality of bolt openings 40 is provided in the floating levers in which the bolts 39 may be attached. The preferred form of the floating levers is very clearly shown in Fig. 5. These levers are short, as shown, and their lower portions curve slightly toward the rear of the wagon. The links 28 are pivotally attached to the lower ends of the levers, as indicated.

In order to elevate the body, it is necessary to rotate the shaft 7 in a proper direction by means of the gear train 8. When the shaft is rotated in this way the chains are wound up on the shaft and the rollers 16 roll up on the inclined extensions 14 of the guide rails 12. In this way through the main legs 24 a thrust is exerted which produces a tension in the links 28. These links 28 then operate through the floating levers 29 and the legs 31 so as to raise the body. The effect of the floating levers in bringing about an increased inclination of the body is clearly shown by dotted lines in Fig. 1, as the body reaches the limit of its elevation the levers 29 will come into a position such that they will project longitudinally of the legs 31; in other words, they virtually increase the length of these legs at this time. As indicated in Fig. 1, as the body becomes elevated, the legs 31 and 34 are disposed substantially parallel with each other.

Having thus described my invention, I claim as new and desire to secure by Letters Patent,—

1. In a dumping cart or wagon, in combination, a truck, a body thereabove, guides attached to said body, main legs guided at one end in said guides, means for guiding the other ends of said main legs on said truck, means for exerting an upward thrust in said main legs, front legs pivotally mounted on said truck, links connected with the ends of said main legs, and members connecting said links with said front legs pivotally attached to the wagon body and adapted to support the wagon body.

2. In a dumping cart or wagon, in combination, a truck, a body thereabove, guides attached to said body, main legs guided at one end in said guides, means for guiding the other ends of said main legs on said truck, means for exerting an upward thrust in said main legs, front legs pivotally mounted on said truck, links connected with the ends of said main legs, members connecting said links with said front legs connected directly with the wagon body and adapted to support the same, and means independent of the aforesaid parts for guiding the rear portion of said body.

3. In a dumping cart or wagon, in combination, a truck, a body having guides attached to the under side thereof, main legs having their upper ends guided in said guides, means for guiding the lower ends of said main legs on said truck, floating levers attached to the under side of said body forwardly thereof, links connecting the upper ends of said main legs with said floating levers, and front legs pivotally mounted on said truck and pivotally attached to said floating levers.

4. In a dumping cart or wagon, in combination, a truck, a body having guides attached to the under side thereof, main legs having their upper ends guided in said guides, means for guiding the lower ends of said main legs on said truck, floating levers attached to the under side of said body forwardly thereof, links connecting the upper ends of said main legs with said floating levers, front legs pivotally mounted on said truck and pivotally attached to said floating levers, and back legs pivotally attached to said body and pivotally mounted on said truck.

5. In a dumping cart or wagon, in combination, a truck, a body above said truck having guides on the under side thereof disposed longitudinally of said body, guide rails in said truck, main legs having their upper ends guided in said guides, rollers attached to the lower ends of said main legs and running on said guide rails, means for advancing said main legs to elevate said body, floating levers pivotally mounted on the under side of said body forwardly thereof, links connecting the lower ends of said levers and the upper ends of said main legs, front legs pivotally attached to said levers at an intermediate point thereon and pivotally attached to said truck, and rear legs pivotally attached to said truck and to said body.

6. In a dumping cart or wagon, in combination, a truck, a body thereabove, guides attached to the under side of said body extending longitudinally thereof, main legs having cross pins at their upper ends running in said guides, means for guiding and advancing the lower ends of said main legs, floating levers pivotally attached to said body forwardly thereof and having a plurality of openings therein, front legs pivotally attached to said truck and pivotally attached to said floating levers at one of said openings, links connecting the ends of said floating levers with said cross pins, and means for guiding the rear end of said body.

In testimony whereof I have signed my name to this specification in the presence of two subscribing witnesses.

THOMAS WRIGHT.

Witnesses:
J. L. McAULIFFE,
PHILIP D. ROLLHAUS.